UNITED STATES PATENT OFFICE.

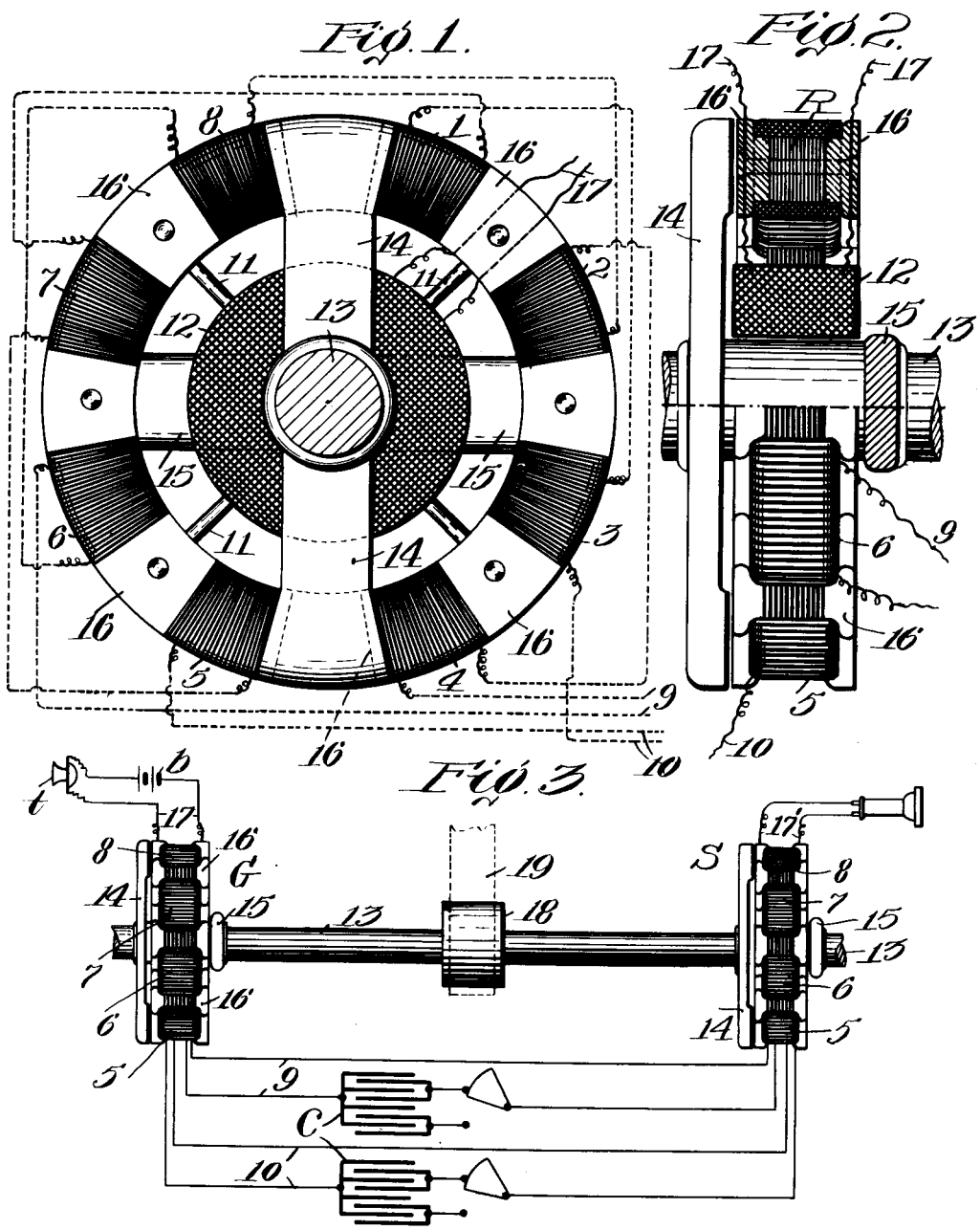

LOUIS W. SOUTHGATE, OF WORCESTER, MASSACHUSETTS.

METHOD OF AND APPARATUS FOR AMPLIFYING VARYING ELECTRIC CURRENTS.

1,033,629.   Specification of Letters Patent.   Patented July 23, 1912.

Application filed October 26, 1908. Serial No. 459,472. Renewed December 26, 1911. Serial No. 667,941.

*To all whom it may concern:*

Be it known that I, LOUIS W. SOUTHGATE, a citizen of the United States, residing at Worcester, in the county of Worcester and State of Massachusetts, have invented a new and useful Method of and Apparatus for Amplifying Varying Electric Currents, of which the following is a specification.

This invention relates to an improved method of and apparatus for amplifying varying electric currents, which invention is particularly adapted for use in telephone work, telegraph work, wireless telegraphy, and generally for amplifying any electric undulations or variations.

The invention while capable of general use will be hereafter described in connection with telephone work.

Various generators have heretofore been proposed for amplifying the varying currents used in telephone circuits, but in these applications either the instrument employed was only adapted for certain frequencies or else introduced features of commutation or collection which are prohibitive on account of the microphonic action which is detrimental to the transmission of speech.

The principle upon which my invention is based is that of impressing the variable telephonic or other currents upon the inducing field of a generator adapted to produce periodically varying currents, preferably of the sine-wave type, thereby producing composite current waves in which the telephonic currents are amplified, and then inductively transferring to a separate circuit only the wave components due to the telephonic or other current variation. My invention overcomes these aforesaid difficulties by producing a generator amplification of the undulatory or varying currents through the magnetic rotation of lines of force without involving the use of commutators or collectors for the electric currents, and without the introduction of any moving parts in the electric circuits. To practice the invention this way I employ a polyphase inductor alternator or generating machine for the amplification of the currents.

The polyphase currents are led to a selector comprising a series of coils, a receiving coil, and a rotating inductor. The series of coils is arranged so that a rotary field effect is produced, and the inductor is arranged to follow this rotary field effect and impress the flux thereof on the receiving coil. If a direct current is applied to the field of the generator, the resulting rotary magnetic field in the selector will have a constant flux which the selector will follow, and will impress on the receiving coil. So long as the flux is constant no current will be induced in the receiving coil. But if the current applied to the field of the generator be a varying current, the rotating magnetic field effect will still exist, but the flux of the field will vary in power and direction in direct proportion to the variations in the current led into the field of the generator, and as changes in said flux will act inductively on the receiving coil, a current will be induced in the receiving coil which necessarily will be of the same character as the original varying current, but which will be as much more powerful than the original current as the amplifying action of the generator is utilized.

By making the field and armature of the generator and the series of coils and the receiving coil of the selector stationary no part of the electric circuits need be rotated, whereby the circuits can be permanently attached to the device, and whereby stationary connections can be used between the generator and selector. This enables me to use condensers, preferably adjustable, in the connections between the generator and selector to balance the induction.

For a more complete understanding of my invention, reference is made to the following description, taken in connection with the accompanying drawings, while the scope of the invention is to be determined by consideration of the appended claims.

Figure 1 of the drawings is a vertical side elevation of one type of apparatus which may be employed to amplify the currents and which is also adapted to serve as a selector or separator to receive the amplified currents. Fig. 2 is an end elevation, partly in section, of the same apparatus. Fig. 3 is a diagram showing the application of the apparatus to a telephone circuit. Fig. 4 is a diagram showing the phase relation of the currents traversing the circuits of the induced winding of the apparatus.

Referring to the drawings in detail, Fig. 1 shows an apparatus adapted to be used in carrying out my method, comprising a generator of the inductor type, having a stationary laminated ring R of magnetic material, carrying insulated coils 1 to 8, inclusive, the alternate coils being connected into two separate circuits 9, 9, and 10, 10, respectively.

Supported within the ring R by means of arms or pins 11, is a stationary field coil 12, within which rotates a shaft 13, carrying arms 14, 15, constituting an inductor, said arms forming the magnetic line directors being upon opposite sides of the generator and arranged at right angles or 90° to each other. The parts of the inductor should be made of iron or steel having a high permeability for the lines of magnetic flux. Secured to the ring R, upon either side between the coils wound thereon, are pole-pieces 16, which preferably project over the coils on either side, so that when a line director is directly over a coil it will project over a portion of the pole-piece on either side, thus affording a good magnetic path for the flux lines which pass from the ends of the magnetic-flux or line director 14, of the inductor to the adjacent poles of the ring R, flowing in opposite directions through each quadrant thereof, and returning to the inductor through the opposite ends of the other line director 15. If now, the stationary exciting field coil 12 be connected through its terminal connections 17 with a battery or other source of direct current, the flux lines of the magnetic field caused thereby will flow through the shaft 13 and in either direction through the magnetic flux director 14, passing in opposite directions through the adjacent quadrants of the ring R and returning in opposite directions through the magnetic flux director 15, thus completing the magnetic circuit of the machine. When the shaft causes the magnetic line directors 14, 15, to revolve in front of the poles 16 of the ring, the revolving field thus set up in the ring will generate alternating electromotive forces in the ring coils which will cause alternating currents to flow in the respective circuits 9 and 10, which are displaced 90° as indicated in Fig. 4. If the current directed into the field 12 is caused to vary, or if there are superposed upon the direct current exciting the field coil 12, varying currents, it will be evident that the electromotive forces generated in the induced or armature coils 1 to 8 of the ring will no longer cause currents to flow into the two circuits 9, 10, of the sine-wave form indicated in Fig. 4, but the currents will be complex waves varying from the sine-waves in proportion to and in accordance with the currents or variations in the exciting current. It will be noted that the phase relation of 90° will always exist.

Inasmuch as the strength of the currents generated in the armature coils depends upon the rate of cutting of the lines of magnetic flux, the amplitude as well as the frequency of the waves of the generated currents will depend upon the speed of the mechanical rotation of the inductor member of the machine. It will therefore be apparent that the components of the waves of generated currents which correspond to the variations in the exciting current, or to the superposed varying currents will also be amplified in amount depending upon the speed of rotation of the inductor. By selecting and combining from the amplified currents only those components corresponding with the superposed currents, or by using only waves due to variations in the exciting field current, and transferring the resultant currents to a separate circuit, currents will flow therein which are the same in wave form characteristics as said variations of the exciting field current, or as said superposed currents, but which are greatly amplified in comparison with the original currents.

In order to utilize the features of my invention above described, I have shown in Fig. 3 a diagrammatic illustration of their application to a telephone system for the purpose of amplifying the telephonic currents as a relay or of amplifying at a receiving station. Two machines of the type previously described are secured to a common shaft which may be driven by means of a pulley 18 connected by a belt 19 to a motor or some other source of power. The machine G has its exciting field coil 12 connected through its terminal wires 17 to a battery $b$ or other source of current in the circuit of which is a means for superposing currents or causing variations corresponding to the telephonic currents. I have shown a transmitter $t$ in said exciting circuit, but it is understood that this may be the coil of a transformer or other transmitting device connected in circuit with the telephone line. The amplified currents which are generated in the ring coils of the generator G, are connected through the pairs of leads 9 and 10, with the two corresponding circuits including the ring coils of selector machine S on the other end of the shaft 13, this machine being similar in construction to the generator G, except the coil relation is made suitable for a transformer instead of for a generator.

In order to compensate for any phase displacement of the currents in the circuits 9 and 10, due to the reactance of the circuits, I may include in these circuits variable or adjustable condensers C having means for varying parts thereof included in circuit.

Upon the mechanical rotation of the inductors upon the shaft 13, two-phase currents will be generated in the ring coils of the machine G, in which the fundamental sine-waves thereof will be modified in accordance with the variations of the exciting current due to the variations or superposed currents corresponding to the telephonic currents. As previously pointed out, the components of the generated currents corresponding to the telephonic currents will be amplified by the generator action of the machine G. The generated currents transmitted through the circuits 9, 10, to the coils of the selector machine S, produce in the ring R thereof a rotary field effect, revolving synchronously with the rotary field effect induced by the inductor of the machine G in its ring core R.

By connecting the circuits of the machine S so that the magnetic field effect rotates in the same direction as the mechanical rotation of its inductor, it will be seen that the rotation of the magnetic line directors of the machine S will always be in synchronism therewith and will always remain in position to close the magnetic circuit of said rotating field through the line directors 14, 15, and the shaft 13. By reversing the connections of ring coil circuits of the machine so as to cause a magnetic rotation of the field effect in the machine S, in a backward or reverse direction at the same speed as the forward rotation of the inductor of the generator G, the resulting field in the machine S will rotate oppositely and its inductor which closes the magnetic circuit of said field must then rotate oppositely to the inductor of machine G.

The magnetic field effect produced in the machine S being produced by the two-phase currents will have a flux through the inductor which is substantially of constant value in so far as the fundamental sine-waves are concerned, as is well understood. This constant flux of uniform direction through the inductor will have no inductive effect upon the receiving coil 12 surrounding the shaft. When, however, the fundamental sine-waves generated in machine G are changed to complex waves by causing variations in the exciting current of the field coil 12, then the flux lines traversing the magnetic circuit of the inductor of machine S, will vary in direct proportion to the amount of such variations or superposed components, and will cause currents to be induced in the coil 12 of the selector machine S corresponding exactly with such variations in the currents generated in machine G. It will now be apparent that a telephone receiver or other instrument connected to the leads 17' of the coil 12 of machine S will receive currents whose characteristics will correspond exactly with the telephone currents or variations introduced into the exciting circuit of the machine G, and that the amplitude of the current waves will be greatly increased by reason of the amplifying effect or generator action of the machine G. It will also be clear that the fundamental waves of the currents in the circuits connecting the generator and selector machines, if current variations are superposed upon a direct current will be eliminated by the selective action of the machine S. If only varying currents are led to the field 12 of the generator G the rotary field effect in the selector will be a rotary effect in which the flux will vary in strength and direction in direct proportion with the original varying current, but which flux will be amplified by the generator G. By means of the transformer effect of the machine S the voltage of the currents taken off into the receiver circuit may be properly regulated.

I have shown the ring coils connected in such a manner that two-phase currents will flow in the connecting circuits 9, 10, but it will be understood that a different number of phases may be employed.

The device is admirably adapted for use as a detector or receiver for wireless telegraphy, as not only will the device act as an amplifier, but it is particularly susceptible to electrical oscillations as there is always a part of the apparatus in condition of increasing magnetism if a direct current is applied to the field of the generator, and as very delicate electrical oscillations will act on an iron core having an increasing magnetic field.

It is obvious that many changes may be made in the apparatus described without departing from the scope of the invention as expressed in the claims.

Having thus fully described my invention, I claim:—

1. A varying current amplifier comprising a polyphase inductor alternator, the field of which is varied by the generating current, and a selector comprising a series of coils to which the generated currents are led to act with a rotary field effect, a receiving coil, and a rotary inductor following the rotary field effect and directing the magnetic flux to act inductively on the receiving coil.

2. A varying current amplifier comprising a polyphase inductor alternator, the field of which is varied by the generating current, and a selector comprising a series of coils to which the generated currents are led, a receiving coil, and an inductor connected to rotate with the alternator and follow the rotary field effect and direct the magnetic flux to act inductively on the receiving coil.

3. A varying current amplifier comprising a polyphase inductor alternator, the field of which is varied by the generating current, and a selector comprising a series of coils to which the generated currents are led, a receiving coil, and a rotating inductor turning inside of the receiving coil and following the rotary field effect and directing the magnetic flux to act inductively on the receiving coil.

4. A varying current amplifier comprising a polyphase inductor alternator having a stationary field and armature, the field of which is varied by the generating current, and a selector comprising a series of stationary coils to which the generated currents are led to act with a rotary field effect, a stationary receiving coil, and a rotating inductor following the rotary field effect and directing the magnetic flux to act inductively on the receiving coil.

5. A varying current amplifier comprising a polyphase inductor alternator having a stationary field and armature, said field being varied by the generating current, a selector comprising a series of coils, stationary electrical connections between said armature and said series of coils arranged so that the generated currents will act in said coils with a rotary field effect, a stationary receiving coil, and a rotating inductor following the rotary field effect and directing the magnetic flux to act inductively on the receiving coil.

6. A varying current amplifier comprising a polyphase alternator, the field of which is varied by the generating current, a selector comprising a series of coils to which the generating currents are led, condensers in said connections, and means for directing the magnetic flux to act inductively on a receiving coil.

7. A varying current amplifier comprising a polyphase inductor alternator having a stationary field and armature, which field is varied by the generating current, a selector comprising a series of stationary coils to which the generating currents are led, condensers in said connections, a receiving coil, and a rotating inductor following the rotary field effect and directing the magnetic flux to act inductively on the receiving coil.

8. A varying current amplifier comprising a polyphase inductor alternator having a stationary field and armature, which field is varied by the generating current, a selector comprising a series of stationary coils to which the generating currents are led, adjustable condensers in said connections, a receiving coil, and a rotating inductor following the rotary field effect and directing the magnetic flux to act inductively on the receiving coil.

In testimony whereof I have hereunto set my hand, in the presence of two subscribing witnesses.

LOUIS W. SOUTHGATE.

Witnesses:
MARY E. REGAN,
C. FORREST WESSON.